(12) United States Patent
Al Obaid

(10) Patent No.: US 11,220,876 B1
(45) Date of Patent: Jan. 11, 2022

(54) LASER CUTTING TOOL

(71) Applicant: Saudi Arabian Oil Company, Dhahran (SA)

(72) Inventor: Omar Mohammed Al Obaid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/916,283

(22) Filed: Jun. 30, 2020

(51) Int. Cl.
| | | |
|---|---|---|
| E21B 29/08 | (2006.01) | |
| E21B 43/119 | (2006.01) | |
| B23K 26/00 | (2014.01) | |
| B23K 26/064 | (2014.01) | |
| E21B 7/15 | (2006.01) | |

(52) U.S. Cl.
CPC .......... *E21B 29/08* (2013.01); *B23K 26/0093* (2013.01); *B23K 26/064* (2015.10); *E21B 7/15* (2013.01); *E21B 43/119* (2013.01)

(58) Field of Classification Search
CPC .......... E21B 29/00; E21B 29/02; E21B 29/08; E21B 43/119; E21B 43/1193; E21B 7/15
See application file for complete search history.

(56) References Cited

U.S. PATENT DOCUMENTS

| | | | |
|---|---|---|---|
| 6,518,543 B1 | 2/2003 | Benz et al. | |
| 6,755,262 B2 | 6/2004 | Parker | |
| 6,888,097 B2 * | 5/2005 | Batarseh | B23K 26/0648 |
| | | | 219/121.7 |
| 7,490,664 B2 | 2/2009 | Skinner et al. | |
| 8,627,901 B1 | 1/2014 | Underwood et al. | |
| 8,678,087 B2 | 3/2014 | Schultz et al. | |
| 8,755,262 B2 | 6/2014 | Ueki | |
| 9,217,291 B2 | 12/2015 | Batarseh | |
| 9,353,612 B2 | 5/2016 | Batarseh | |
| 9,932,803 B2 | 4/2018 | Batarseh et al. | |
| 10,273,787 B2 | 4/2019 | Montaron et al. | |
| 2006/0102343 A1* | 5/2006 | Skinner | G01N 21/718 |
| | | | 166/250.1 |
| 2006/0231257 A1 | 10/2006 | Reed et al. | |
| 2006/0237233 A1 | 10/2006 | Reed et al. | |
| 2010/0078414 A1 | 4/2010 | Perry et al. | |

(Continued)

FOREIGN PATENT DOCUMENTS

| | | |
|---|---|---|
| CN | 203081295 U | 7/2013 |
| CN | 203334954 U | 12/2013 |

(Continued)

OTHER PUBLICATIONS

International Search Report for PCT/IB2020/057396, 5 pages (dated Mar. 2, 2021).

(Continued)

*Primary Examiner* — David Carroll
(74) *Attorney, Agent, or Firm* — Choate, Hall & Stewart LLP; Charles E. Lyon; Peter A. Flynn

(57) ABSTRACT

An example laser tool is configured to operate within a casing or liner in wellbore of a hydrocarbon-bearing rock formation. The tool is configured to cut sections into the casing or liner material. The cut sections may break off or may be broken off using a breaking tool. The sections may be cut in a region of the casing or liner that includes a kick-off point for sidetracking operations.

20 Claims, 3 Drawing Sheets

(56) References Cited

U.S. PATENT DOCUMENTS

| | | | |
|---|---|---|---|
| 2010/0215326 A1* | 8/2010 | Zediker | E21B 7/15 |
| | | | 385/100 |
| 2011/0278270 A1* | 11/2011 | Braga | E21B 7/14 |
| | | | 219/121.71 |
| 2012/0074110 A1* | 3/2012 | Zediker | B23K 26/1224 |
| | | | 219/121.72 |
| 2013/0000906 A1 | 1/2013 | Schultz et al. | |
| 2014/0060930 A1 | 3/2014 | Zediker et al. | |
| 2014/0305660 A1* | 10/2014 | Ash | G01V 1/523 |
| | | | 166/381 |
| 2014/0360778 A1 | 12/2014 | Batarseh | |
| 2016/0273325 A1* | 9/2016 | Montaron | E21B 43/11 |
| 2017/0191314 A1 | 7/2017 | Faircloth et al. | |
| 2019/0353032 A1 | 11/2019 | Batarseh | |

FOREIGN PATENT DOCUMENTS

| | | |
|---|---|---|
| GB | 2 420 135 A | 5/2006 |
| WO | WO-2012/031009 A1 | 3/2012 |
| WO | WO-2015/088553 A1 | 6/2015 |
| WO | WO-2016/090229 A1 | 6/2016 |
| WO | WO-2017/030806 A1 | 2/2017 |
| WO | WO-2019/220198 A1 | 11/2019 |

OTHER PUBLICATIONS

Written Opinion for PCT/IB2020/057396, 8 pages (dated Mar. 2, 2021).

* cited by examiner

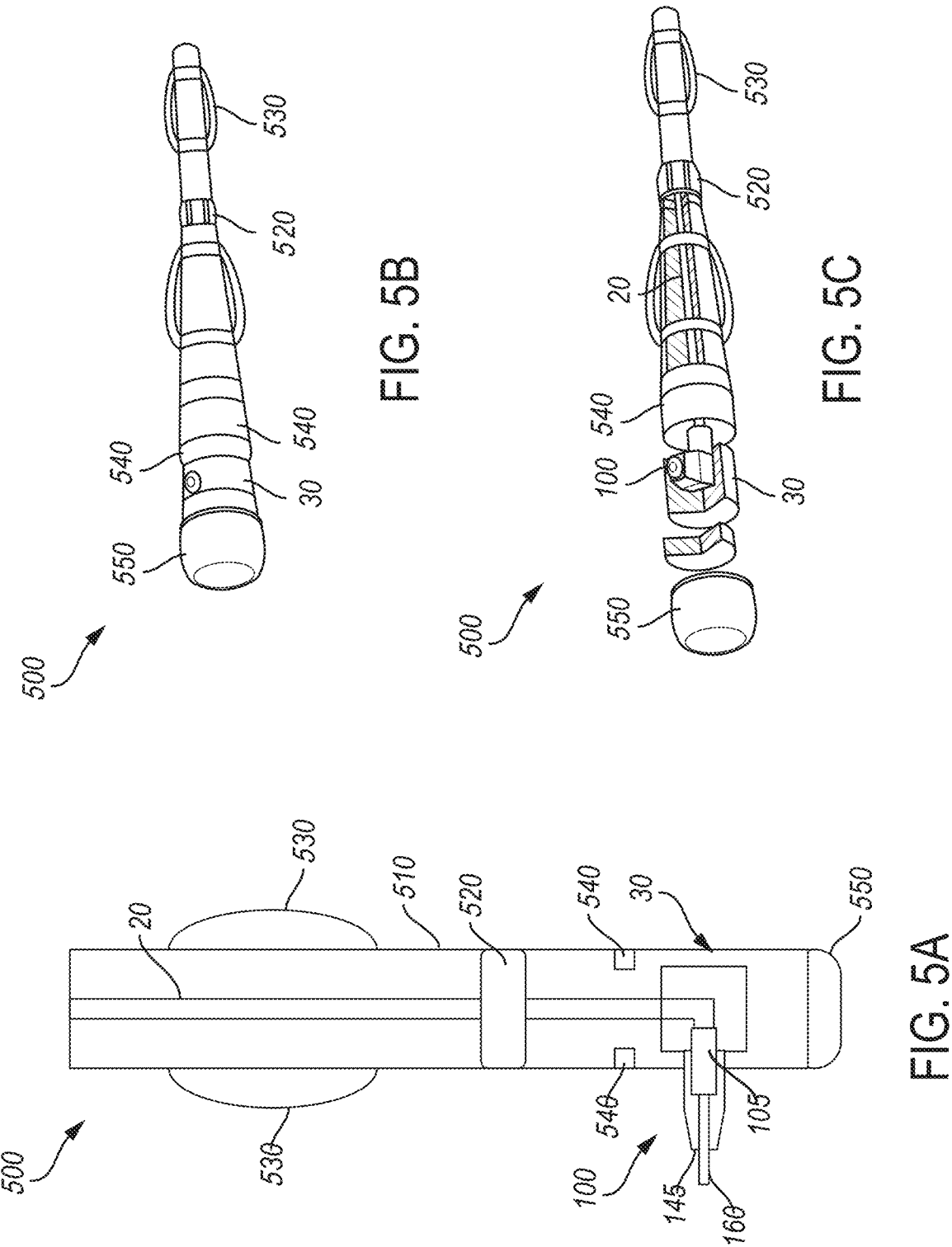

LASER CUTTING TOOL

TECHNICAL FIELD

This specification describes examples of laser tools that are usable in a wellbore for the treatment of tubing.

BACKGROUND

Wellbore operations include drilling of a wellbore that is subsequently lined with steel tubing, for example, casings or liners. In some instances, it is necessary to drill a secondary wellbore branching away from the original wellbore because the original well has become unusable or inaccessible, for example, due to irretrievable downhole equipment, debris in the hole, or a collapsed wellbore. This process is known as sidetracking. When a bypass is desired, a secondary wellbore may be drilled substantially parallel to the original well, but other well geometries are possible, for example, for wellbores to explore geologic formations near the original wellbore. Sidetracking operations may include a deployment of a so-called whip stock, which guides a drill in the desired direction away from the original wellbore.

SUMMARY

An example system includes a laser tool configured to operate within a wellbore of a hydrocarbon-bearing rock formation to cut one or more sections in a casing or liner. The laser tool includes one or more optical transmission media. The one or more optical transmission media are part of an optical path originating at a laser generator configured to generate a laser beam. The one or more optical transmission media are for passing the laser beam. The laser tool includes a mono-optic element that is part of the optical path. The mono-optic element is for receiving the laser beam from the one or more optical transmission media and for altering at least one of a geometry or a direction of the laser beam for output to the casing or liner in the hydrocarbon-bearing rock formation. The laser tool includes one or more sensors to monitor one or more conditions in the wellbore and to output signals based on the one or more conditions. The laser tool includes a breaking tool to dislodge one or more cut sections.

The laser tool may include a focusing system configured to focus or to collimate the laser beam prior to output. The focusing system may include the mono-optic element. The mono-optic element may be configured to focus or to collimate the laser beam prior to output.

The focusing system may include a laser muzzle to discharge the laser beam from the focusing system. The focusing system may include a fluid knife proximate to a part of the mono-optic element that faces the laser muzzle. The fluid knife may be configured to sweep the mono-optic element. The focusing system may include a purging nozzle proximate to the laser muzzle. The purging nozzle may be configured to remove dust and vapor from a path of the laser beam. The focusing system may include a vacuum nozzle proximate to the laser muzzle. The vacuum nozzle may be configured to collect dust and vapor from the path. The focusing system may include a temperature sensor adjacent to the laser muzzle.

An example system may include a stabilizer attached to the laser tool and configured to hold the laser tool in place relative to a casing in a wellbore. An example system may include a shock absorber located at an end of the laser tool and configured to absorb impact to a distal end of the laser tool.

The mono-optic element may include at least one of a crystal, a lens, a mirror, a prism, a cube, a cylinder, or a cone. The mono-optic element may include a structure including two or more of: a crystal, a lens, a mirror, a prism, a cube, a cylinder, or a cone.

The breaking tool may include a drill or a mill. An example system may include a collection tool downhole or the laser tool to collect the one or more cut sections.

An example method is performed within a casing or liner in a wellbore of a hydrocarbon-bearing rock formation. The method includes passing, through one or more optical transmission media, a laser beam generated by a laser generator at an origin of an optical path including the one or more optical transmission media. The method includes rotating, about an axis, and translating, along the axis, a laser tool including a mono-optic element that is part of the optical path. The mono-optic element receives the laser beam from the one or more optical transmission media and alters at least one of a geometry or a direction of the laser beam for output to the casing or liner. Thereby, one or more sections are cut in the casing or liner and the one or more cut sections or an underlying cement layer are caused to expand.

An example method may include rotating and translating the laser tool to target a different area of the casing or liner.

An example method may include operating the laser generator in a run mode.

The cutting of one or more sections and the expansion of the cement layer may cause the cut sections to detach and fall downhole.

An example method may include monitoring, using one or more sensors, one or more conditions in the wellbore during operation of the laser tool. The example method may include outputting signals based on the one or more conditions.

An example method may include the mono-optic element focusing or collimating the laser beam, sweeping the mono-optic element using a fluid knife. and purging a path of the laser beam using a purging nozzle during the run mode of the laser generator.

An example method may include purging a path of the laser beam using the purging nozzle; and vacuuming the dust and vapor using the vacuum nozzle.

An example method may include dislodging one or more cut section and causing the one or more cut sections to fall downhole. The dislodging may include drilling or milling. An example method may include collecting the one or more cut sections.

At least part of the processes and systems described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DESCRIPTION OF THE DRAWINGS

FIG. 5A is a cross-sectional view of components including a laser tool for cutting a casing or liner in a wellbore. FIG. 5B is a perspective view of the components of FIG. 5A.

FIG. 5C is a perspective, exploded, cut-away view of the components shown in FIG. 5A.

Like reference numerals in the figures indicate like elements.

DETAILED DESCRIPTION

This specification describes examples of laser tools for cutting steel structures in a wellbore, for example, a finished well, through a hydrocarbon-bearing rock formation. In some implementations, the technologies described in this specification relate to preparing a finished well for side tracking operations. A finished well may include one or more casings or liners. Casings or liners are or include steel tubing that is cemented in place in a wellbore. A wellbore may include several concentric casings or liners, or both, each of which may be cemented in place. During sidetracking, a drill is guided in a direction away from the wellbore, for example, using a whipstock device. A whipstock resembles a wedge that in inserted into the well just below the so-called kick off point to block the well at a desired angle, thereby pushing the drill bit in the desired direction. Prior to the drilling operation, a casing or liner may be partially or completely removed from the sidetracking region around the kick off point. Conventionally, removing one or more liners is carried out by mechanical milling. This specification describes a laser tool to cut sections of a casing or liner that are then removed to a section of the wellbore downhole of the desired sidetracking location. The removal of casing or liner material (partially or completely) from the sidetracking location using the technologies described in this specification may improve or accelerate preparation of a wellbore for sidetrack drilling operations. The use of a laser tool as described may provide greater control of liner removal operation than traditional milling operations, for example, by targeting only specific regions of a casing or liner, or by weakening the area surrounding a kick off point prior to traditional milling.

Figure 1:
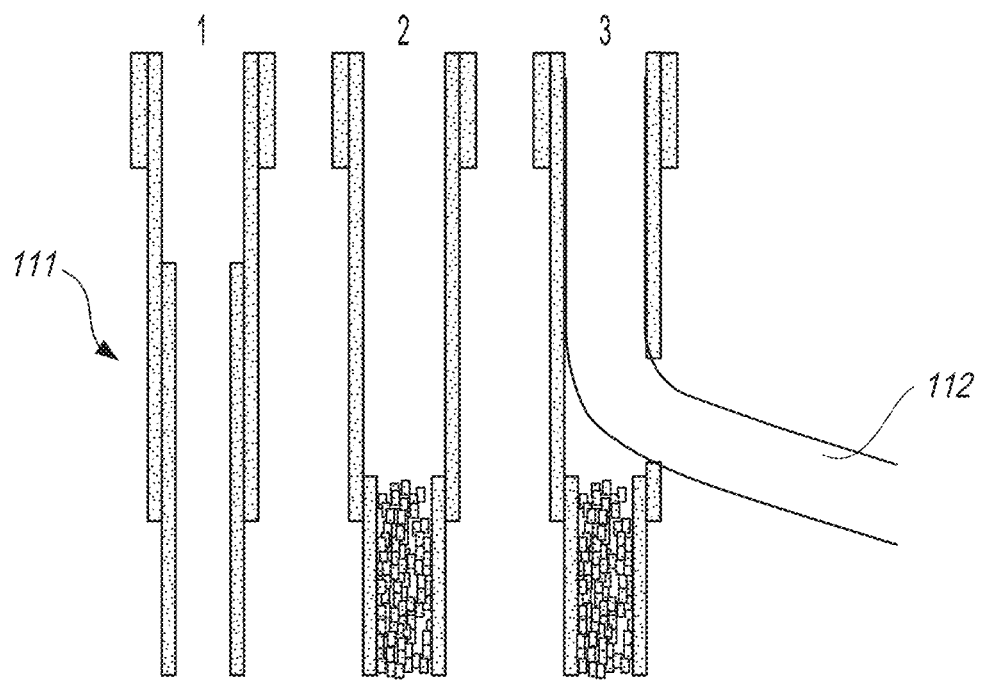
FIG. 1 is a schematic illustrating removal of interior liner sections prior to a sidetracking procedure.
Figure 2:
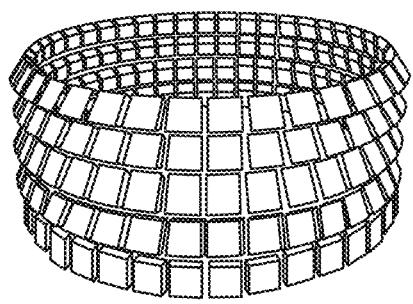
FIG. 2 is a perspective view of an example grid pattern of laser cut sections in an example liner.

FIG. 1 illustrates removal of an interior casing or liner near a desired kick off point 111 prior to sidetracking (1). Removed casing or liner material is collected downhole (2). Sidetrack drilling a predetermined path 112 may then proceed (3). In some implementations, a liner removal procedure includes a two-step process. During the first step, a laser tool is lowered into the well to the desired location. In some implementations, the laser tool includes or is connected to implements that allow for rotation or translation of the laser beam, for example, to adjust laser beam position. A laser beam's direction may be adjusted intermittently or continuously during operation, for example, to cut a desired pattern into a casing or liner. In some implementations, a grid pattern of cut sections may be cut into a casing or liner, for example, as shown in FIG. 2. In some implementations, a laser may cut square shaped sections into a casing or liner, for example, as shown in FIG. 2. In some implementations, other shapes, for example, rectangle, triangle, diamond, round, or other shapes may be cut into the steel liner.

Figure 3:
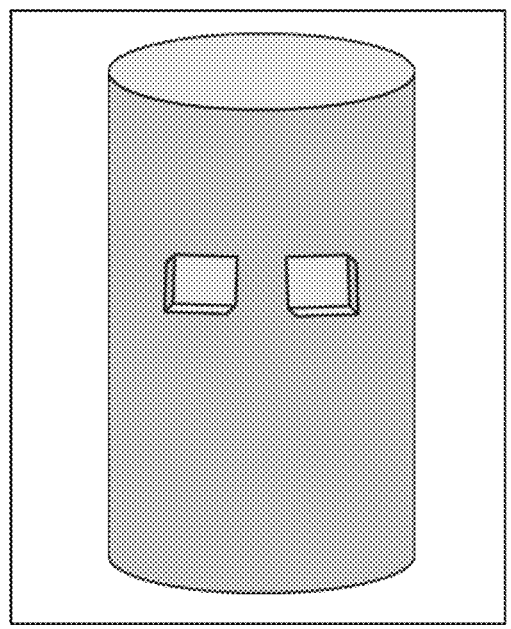
FIG. 3 is a photograph of example laser cuts in a steel liner.

FIG. 3 is a photograph of example laser cuts in a steel liner in a proof-of-concept study. Under atmospheric conditions, an example laser may cut 0.29 inches of steel at a rate of approximately 22-25 mm/s (millimeters per second). In a given 4.5 inch diameter tubing with a wall thickness of 0.29 inches, a radial cut may be achieved in approximately 20 seconds. In a fluid environment, cutting rate may slower, for example, approximately 18-20 mm/s. For example, if the distance between radial cuts is 1 inch and the radial angle between vertical cuts is 45 degrees (8 vertical cuts), then a total time needed to grid a 1-foot section (along the tubing length) is under 6 minutes assuming a cutting speed of 20 mm/s (conventional milling processes tend to be slower, for example, as slow as 20 feet/day).

The laser beam intensity may be selected such that the laser beam is powerful enough to cut through a steel casing or liner. In some implementations, laser power and duration may be selected such that the laser beam cuts through a steel casing or liner and causes thermal expansion of the steel or the underlying cement layer, or both. In some implementations, the thermal expansion, for example, of the cement layer, may cause one or more cut sections to detach completely from underlying material and fall down the well. In some implementations, the thermal expansion may cause the cut sections to partially detach from underlying material. In some implementations, kick off depth may be 600 m or more above the bottom of a well, which provides sufficient space to collect the cut sections.

In some implementations, thermal expansion may cause the cut sections to protrude at least partially inwards on into the well. In a second step of the process, the laser tool is removed and a mechanical breaking tool is lowered into the well to detach the cut sections from the underlying material and cause the cut sections to fall down the well. In some implementations, a breaking tool is or includes a shearing implement. In some implementations, a breaking tool is or includes a coring drill bit, for example, a drill bit that applies a scraping motion or action to casing or liner. In some implementations, a breaking tool is or includes a milling tool, for example, a tool that applies a cutting action laterally to a wellbore wall. In some implementations, a milling tool, may be or include a taper mill, a bladed mill, or a cement mill.

In some implementations, a collection tool may be deployed prior to laser or breaking operation to collect and retrieve cut sections. A collection tool may be positioned downhole of a section of casing or liner that is being cut by the laser tool. In some implementations, a collection tool may be or include a basket or net suspended from a support structure at or near the surface opening of the wellbore. In some implementations, a collection tool may be or include an inverted umbrella type configuration suspended from a support structure at or near the surface opening of the wellbore. Such umbrella type device may travel through the wellbore in a folded configuration and may be deployed into an unfolded configuration once the tool is positioned at a desired location.

An implementation of a laser tool described in the preceding paragraphs includes a focusing system that holds a mono-optic element. An example of a mono-optic element is a unitary optical structure configured—for example, structured, arranged, or both—to manipulate a laser beam. Manipulation includes altering one or more properties of the laser beam. Examples of mono-optic elements include a crystal and a lens. In some implementations, a mono-optic element may be or include a mirror. Other examples of mono-optic elements are provided in this specification.

The mono-optic element is configured to receive, via an optical path, a raw laser beam output from a laser generator. The optical path may include one or more optical transmission media, such as fiber optic cables, that are strung downhole. The received laser beam is "raw" in the sense that the laser beam has not been acted-upon by the mono-optic element. The mono-optic element manipulates the raw laser beam by altering a geometry of the raw laser beam, a direction of the raw laser beam, or both the geometry and the direction of the raw laser beam. The laser beam output by the mono-optic element is directed to the casing or liner where, as described previously, the laser beam heats steel or concrete to cut sections in the casing or liner. The laser tool, or one or more components of the tool, may be configured to rotate, which also affects the direction of the laser beam. The laser tool, or one or more components of the tool, may be configured to translate along a depth of a wellbore, which also affects the direction of the laser beam.

An example laser tool may also include one or more sensors to monitor environmental conditions in the wellbore and to output signals indicative of the environmental conditions. Examples of the sensors may include temperature sensors to measure temperature downhole, pressure sensors to measure pressure downhole, and acoustic sensors to measure noise levels downhole. Other sensors may also be used as described in this specification. Signals received from the sensors may indicate that there are problems inside the wellbore or that there are problems with the laser tool. A drilling engineer may take corrective action based on these signals. For example, if a temperature or pressure downhole is such that drilling equipment, such as the laser tool, may be damaged, that equipment may be withdrawn from the wellbore.

Figure 4:
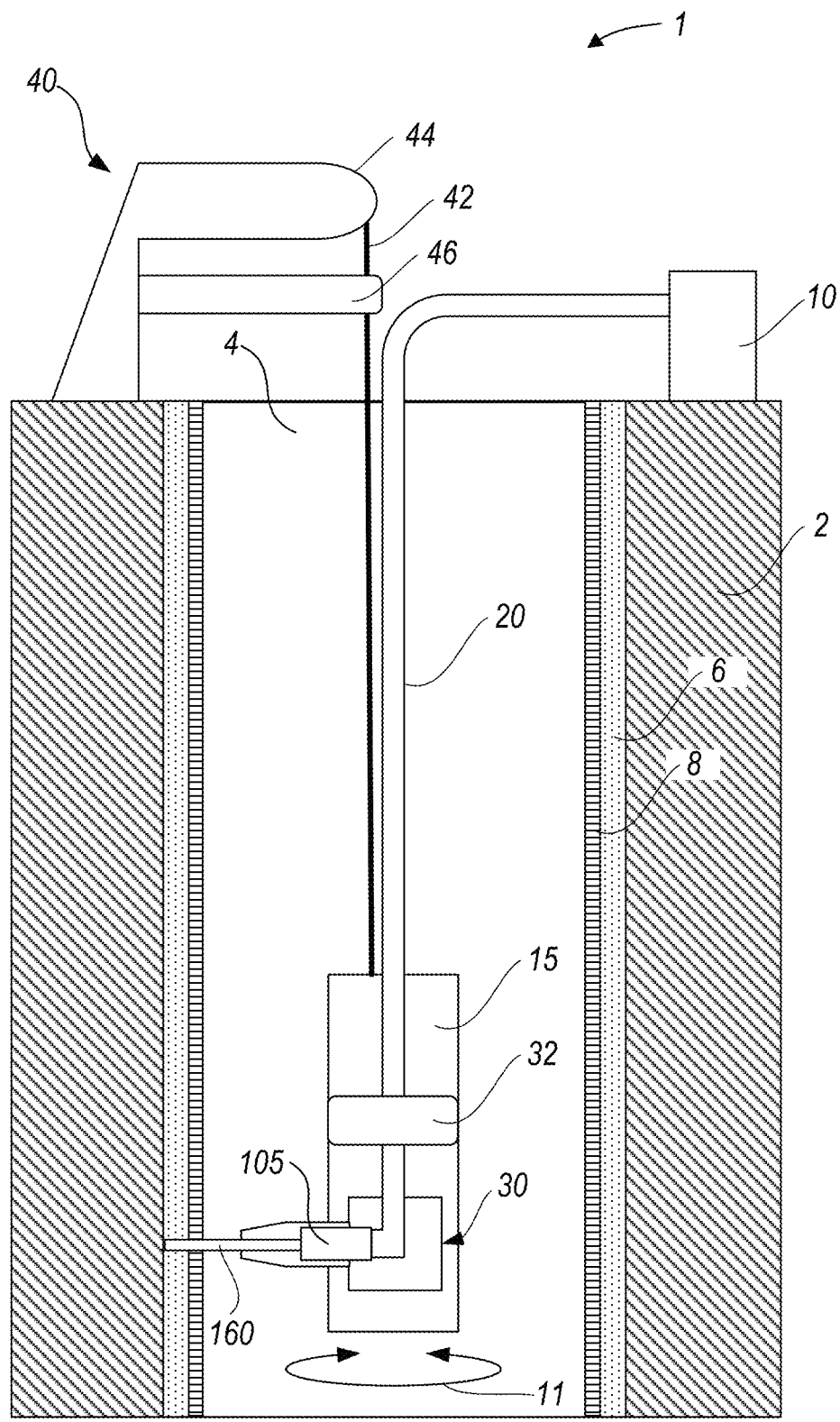
FIG. 4 is a cross-sectional view of an example system for laser cutting a casing or liner in a wellbore.

FIG. 4 shows components of an example system 1 that includes an implementation of a laser tool 30 of the type described in the preceding paragraphs. At least part of system 1 is disposed within wellbore 4. Wellbore 4 passes through a hydrocarbon-bearing rock formation 2 ("rock formation 2"). An example casing or liner 8 is cemented 6 in place to reinforce the wellbore against rock formation 2. A string 15 that houses the laser tool 30 is run downhole through casing 8.

Laser tool 30 is configured to output a laser beam 160. In this example, the laser tool is also configured to rotate about an axis in the wellbore, such as a central axis of the wellbore. In some implementations, the laser tool 30 is mounted on an axle (not shown) for rotation. A motor 32 may be included in string 15 to implement the rotation of laser tool 30 about the axle. In some implementations, the entire string 15 is connected to a drive arrangement 46 that is configured to rotate string 15 and thus laser tool 30. Rotation of the laser tool is identified by circular arrow 11. During rotation, laser beam 160 may sweep the entire circumference of the wellbore. That is, the laser tool may rotate a full 360°. In some cases, the laser tool may rotate less than 360°.

In some implementations, laser tool 30 is mounted on an implement, for example, an extendable arm (not shown) for translation of the laser tool 30 along a length of a wellbore (up or down) independently from string 15. In some implementations, the arm may be or include a set of concentric tubes. A motor may be included in string 15 to implement translation of laser tool 30. In some implementations, motor 32 may be used to translate laser tool 30, for example, in combination with a gear mechanism. The combination of rotation and translation of tool 30 may allow cutting of two-dimensional patterns into a casing or liner.

Laser tool 30 is configured to direct laser beam 160 parallel to a surface containing the wellhead or at an angle that is not parallel to the surface. Laser tool 30 includes a mono-optic element 105 that is configured to affect the output of the laser beam. For example, the mono-optic element may direct, collimate, focus, defocus, or otherwise manipulate the direction or geometry of the laser beam 160 prior to output. Operation of the laser tool and mono-optic element are described subsequently.

System 1 includes a laser generating unit, such as laser generator 10. Laser generator 10 is configured to generate a laser beam and to output the laser beam to the laser tool. In some implementations, laser generator 10 is at the surface near to the wellhead. In some implementations, laser generator 10 is downhole, in whole or in part. The laser beam output by laser generator 10 is referred to as a raw laser beam because it has not been manipulated by laser tool 30. Examples of laser generator 10 include ytterbium lasers, erbium lasers, neodymium lasers, dysprosium lasers, praseodymium lasers, and thulium lasers. In an example implementation, laser generator 10 is a 5.34 kilowatt (kW) ytterbium-doped, multi-clad fiber laser.

In some implementations, laser generator 10 can be configured to output laser beams having different energy densities. Laser beams having different energy densities may be useful for steel or cement cutting. In some implementations, the operation of laser generator 10 is programmable. For example, laser generator 10 may be programmed to vary the optical properties of the laser beam or the energy density of the laser beam.

In some implementations, the laser beam output by laser generator 10 has an energy density that is sufficient to heat, cut, or melt steel or other metals or metal alloys. In this regard, the energy density of a laser beam is a function of the average power output of the laser generator during laser beam output. In some implementations, the average power output of laser generator 10 is in one or more of the following ranges: between 500 Watts (W) and 1000 W, between 1000 W and 1500 W, between 1500 W and 2000 W, between 2000 W and 2500 W, between 2500 W and 3000 W, between 3000 W and 3500 W, between 3500 W and 4000 W, between 4000 W and 4500 W, between 4500 W and 5000 W, between 5000 W and 5500 W, between 5500 W and 6000 W, between 6000 W and 6500 W, or between 6500 W and 7000 W.

Laser generator 10 is part of an optical path that includes laser tool 30 and one or more optical transmission media. This optical path extends to the mono-optic element in the laser tool. An example of an optical transmission medium that may be used is fiber optic cable 20. Fiber optic cable 20 may include a single fiber optic strand, multiple fiber optic strands, or multiple fiber optic cables that are run downhole from laser generator 10. Fiber optic cable 20 conducts the raw laser beam output by laser generator 10 to the laser tool 30. As described, the laser tool may manipulate the laser beam to change the geometry of the laser beam, the direction of the laser beam, or both. A laser beam 160 output from the laser tool may penetrate downhole casings and cement, and may reach the rock formation. In the example of FIG. 4, this means that the laser beam exits string 15 and penetrates casing 8 and cement 6. The system may be configured to minimize, or to reduce, power loss along the optical path. In some implementations, each laser beam 160 has a power density or energy density (at the laser beam's target) that is 70% or more of the power density or energy density of the laser beam output by laser generator 10.

The duration that the laser beam is applied to the casing or liner may affect the extent to which the laser beam heats the casing or liner material or underlying cement. For example, the more time that the laser beam is applied to a particular location, the greater the heating at that location may be.

In some implementations, laser generator 10 is configured to operate in a run mode that may include a cycling mode, a continuous mode, or both. During the continuous mode, laser generator 10 generates a laser beam continuously, for example, without interruption. In the continuous mode, laser generator 10 produces the laser beam until a target cut length or depth is reached. During the cycling mode, laser generator 10 is cycled between being on and being off. In some implementations, laser generator 10 generates a laser beam during the on period. In some implementations, laser generator 10 does not generate a laser beam during the off period. In some implementations, laser generator 10 generates a laser beam during the off period, but the laser beam is interrupted before reaching laser tool 30 downhole. For example, the laser beam may be safely diverted or the laser beam may be blocked from output. Laser generator 10 may operate in the cycling mode to reduce the chances of one or more components of the system overheating, to clear a path of the laser beam, or both.

In cycling mode, a duration of an on period can be the same as a duration of an off period. In the cycling mode, the duration of the on period can be greater than the duration of the off period, or the duration of the on period can be less than the duration of the off period. The duration of each on period and of each off period may be based on a target cut length or depth. Other factors that may contribute to the duration of on periods and the duration of off periods include, for example, casing or liner thickness or material composition, purging methods, laser beam diameter, and laser power.

The duration of each on period and of each off period may be determined by experimentation. Experiments on a sample casing or liner material may be conducted prior to, or after, lowering the laser tool into the wellbore. Such experiments may be conducted to determine, for a cycling mode, optimal or improved durations of each on period and of each off period. Alternatively or additionally, the duration of each on period and of each off period may be determined based on metallurgical data of casing or liner material. In this regard, the selection of a run mode may be based on a type of casing or liner and a target penetration depth or cut length. Penetration depth may vary between 1 mm and 100 mm, for example between 5 mm and 50 mm, or between 5 mm and 10 mm. Cut length may vary between 1 mm and 1 m, or more, for example, between 10 mm and 100 mm.

System 1 includes a motion system 40. The motion system can include, for example, a hydraulic system, an electrical system, or a motor-operated system to move the laser tool to a target location. In this regard, the motion system is configured to move the laser tool to different locations, such as depths, within the wellbore 4. To this end, the motion system includes at least one component that is movable within the wellbore. For example, the motion system may include cable 42 that is configured to move uphole or downhole to enable the laser tool reach a target elevation. In an example, cable 42 may be at least partially spooled on a reel. A motor 44 may be connected to the reel. Motor 44 is configured to drive the reel to wind or to unwind cable 42. This causes cable 42 to move uphole or downhole within the wellbore.

Cable 42 is connected physically to string 15 such that movement of cable 42 translates to corresponding movement of string 15. As noted, string 15 houses laser tool 30. Thus, when string 15 moves, laser tool 30 also moves. Accordingly, the length of cable 42 within the wellbore may be controlled to position the laser tool.

In some implementations, the motion system uses components other than cable 42 to move the laser tool. For example, the motion system may use a coiled tubing string to connect to string 15. The coiled tubing string may be moved uphole or downhole in the same manner as cable 42 is moved uphole or downhole.

In some implementations, the motion system can include a rotational drive system to implement rotation of string 15, and thus rotation of laser tool 30, about an axis in the wellbore. In an example implementation, the rotational drive system includes a motor and a drive train, such as an axle or rack and pinion arrangement (not shown), connected to cable 42 to implement the rotation of string 15.

A computing system may be configured—for example, programmed—to control positioning and operation of the laser tool. Examples of computing systems that may be used are described in this specification. Alternatively, or in addition, the laser generator may be configured to control positioning and operation of the laser tool. For example, the laser generator may include circuitry or may include an on-board computing system to implement control over the positioning and operation of the laser tool. In either case, signals may be exchanged with the motion system and the laser tool via wired or wireless connections. In some implementations, signals may be exchanged with the motion system or laser tool via fiber optic media.

During operation, laser tool 30 may relay its angular position or depth position (or both) to a control system, such as the computing system or the laser generator. In response, the control system may operate the tool to form cuts in a casing or liner.

Materials used to implement the downhole components of system 1 may be resistant to the temperatures, pressures, and vibrations that may be experienced within wellbore 4. The materials may protect the system from fluids, dust, and debris. In some implementations, the materials include one or more of iron, nickel, chrome, manganese, molybdenum, niobium, cobalt, copper, titanium, silicon, carbon, sulfur, phosphorus, boron, tungsten, steel, steel alloys, stainless steel, or tungsten carbide.

FIGS. 5A, 5B, and 5C show an example implementation (string 500) of the string 15 of FIG. 4, including the laser tool. String 500 includes laser tool 30, fiber optic cable 20, and outer case 510. Outer case 510 is a protective cover and can be made of any material that is resistant to the temperatures, pressures, or vibrations experienced within wellbore 4. Fiber optic cable 20 is part of the optical transmission path that extends between the laser generator and the laser tool.

String 500 includes an example orientation system 520. Orientation system 520 is configured to control the angular position of laser tool 30, including mono-optic element 105, to direct an output laser beam at a target. Orientation system 520 may include a hydraulic system, an electrical system, or a motor-operated system to implement rotational motion of the laser tool. In some implementations, orientation system 520 includes an electric motor and an axle on which laser tool 30 is mounted. The electric motor controls rotation around the axle. Orientation system 520 includes a control system, a power supply, and a communication device configured to exchange communications with a control system, such as a computing device or a laser generator. The communications exchanged between the control system and the orientation system may be used to control the angular position of the laser tool. The orientation system may be used in combination with rotation of the string containing the laser tool to move the laser tool at a target angular position. For example, the orientation system may provide for finer angular control than rotation of the string.

In some implementations, orientation system 520 is configured to control translation along the depth of a wellbore (up or down) of laser tool 30, including mono-optic element 105, to direct an output laser beam at a target. Orientation system 520 may include or be connected to an implement for translation, for example, a hydraulically actuated arm or a set of concentric tubes. In some implementations, concentric tubes are connected to each other via screw/thread configuration such that rotation of one or more of the concentric tubes around it longitudinal axis causes translation (longitudinal movement) of one concentric tube relative to the other. An electric motor may control rotation of the concentric tubes. The orientation system may be used in combination with uphole or downhole movement of the string containing the laser tool to move the laser tool at a target depth. For example, the orientation system may provide for finer depth control than translation of the string. The combination of string-independent rotation and translation control at millimeter or centimeter resolution provides for a system to cut sections of, for example, 2 cm by 2 cm, into a casing or liner.

String 500 may include one or more stabilizers 530. The stabilizers are configured to resist unwanted movement of string 500 inside the wellbore. In some implementations, stabilizers 530 anchor the string 500 in place by maintaining contact with an interior wall of wellbore 4 at least for the duration of operation of laser tool 30. This duration may include a period during which laser beam is output. Stabilizers 530 can be made of metal, polymer, or of any other material. In some implementations, stabilizers 530 include a spring or a damper, or both. In some implementations, stabilizers 530 include a solid piece of a deformable material. In some implementations, stabilizers 530 include a hydraulic or pneumatic device.

String 500 may include one or more sensors 540 to monitor one or more environmental conditions in the wellbore, one or more conditions of string 500, or both environmental conditions and conditions of the string. Sensors 540 can be attached to, or integrated into, string 500. In some implementations, sensors 540 can be configured to monitor temperature in the wellbore, surface temperature of string 500, mechanical stress in a casing or liner, mechanical stress in string 500, a flow of fluids in the wellbore, a presence of debris in the wellbore, fluid pressure in the wellbore, radiation in the wellbore, noise in the wellbore, magnetic fields in the wellbore, or a combination of two or more of these conditions.

In some implementations, sensors 540 may include one or more temperature sensors, one or more acoustic sensors, or one or more pressure sensors, one or more strain sensors, or some combination of these or other sensors. In an example implementation, laser tool 30 can include at least one temperature sensor. The temperature sensor is configured to measure a temperate at its current location and to output signals representing that temperature. The signals may be output to a computing system located on the surface. In response to signals received from the temperature sensor, the computing system may control operation of the system. For example, if the signals indicate that the temperature downhole is great enough to cause damage to downhole equipment, the computing system may instruct that action be taken. For example, all or some downhole equipment, including the laser tool, may be extracted from the well. In some implementations, data collected from the temperature sensor can be used to monitor the intensity of laser beam 160. Such measurements may be used to adjust the beam energy.

In some implementations, the signals may indicate a temperature that exceeds a set point that has been established for the laser tool or downhole equipment. For example, the set point may represent a maximum temperature that the laser tool can withstand without overheating. If the set point is reached, the laser tool may be shut-down. The value of the set point may vary based on type of laser being used or the materials used for the manufacture of the laser tool, for example. Examples of set points include 1000° Celsius (C), 1200° C., 1400° C., 1600° C., 1800° C., 2000° C., 2500° C., 3000° C., 3500° C., 4000° C., 4500° C., 5000° C., 5500° C., and 6000° C. In an example implementation, the set point is between 1425° C. and 1450° C.

In some implementations, string 500 includes shock absorber 550 to mitigate mechanical impacts to the laser tool. In some examples, shock absorber 550 can be made of metal, polymer, or any type of material that is resistant to temperatures, pressures, vibrations, and impacts that may be experienced within a wellbore. In some implementations, shock absorber 550 is located at a distal end of string 500. In some implementations, shock absorber 550 includes a spring, a damper, or both a spring and a damper. In some implementations, shock absorber 550 includes a solid piece of a deformable material. In some implementations, shock absorber 550 may be implemented using a hydraulic or pneumatic device.

In this example, laser tool 30 includes focusing system 100 to focus the laser beam. The laser beam passes through the focusing system and exits the focusing system through muzzle 145. Focusing system 100 is configured to taper such that a diameter of focusing system 100 is smaller at its output than at the intersection to the outer case. The tapering of the focusing system can reduce the chances that dust, vaporized rock, or both, will enter the tool.

The focusing system includes mono-optic element 105. The mono-optic element is configured to receive a raw laser beam from the optical transmission path and to manipulate the raw laser beam to produce a laser beam output, such as laser beam 160. As described, manipulating the laser beam may include altering a direction of the laser beam or changing a geometry of the laser beam. The geometry of the laser beam may include the cross-sectional shape of the laser beam. For example, the cross-sectional shape of the laser beam may change from circular to oval or from oval to rectangular. The geometry of the laser beam may include the size of the laser beam. For example, during focusing, the laser beam may decrease in cross-sectional diameter and volume, but maintain its overall shape. During defocusing— or scattering—the laser beam may increase in cross-sectional diameter and in volume.

In some examples, a mono-optic element may include a crystal, a lens, a mirror, a prism, a cube, a cylinder, or a cone. In some examples, mono-optic element 105 is or includes a cylinder. One or both bases of the cylinder can be flat, angled, conical, concave, or convex. In some examples, mono-optic element 105 is made of glass, plastic, quartz, crystal, or any other material capable of directing, focusing, or otherwise affecting a geometry or other property of a laser beam. In some examples, mono-optic element 105 may be a single optical structure comprised of two or more components, such as a crystal, a lens, a mirror, a prism, a cube, a cylinder, or a cone.

In some implementations, an initial position, an optical property, or both an initial position and an optical property of mono-optic element 105 is established prior to output of a laser beam. The position of the mono-optic element may be adjusted by changing a position of the laser tool, as described previously. In some implementations, the position of the laser tool, and thus of the mono-optic element, can be adjusted while the laser beam is being output. In some implementations, the position of mono-optic element 105 can be adjusted while the laser beam is off. An optical property of the mono-optic element may be adjusted, for example, by heating mono-optic element 105, for example using one or more electric heating elements in contact with the mono-optic element. In some implementations, an optical property of mono-optic element 105 can be adjusted while the laser beam is being output. In some implementations, an optical property of mono-optic element 105 can be adjusted while the laser beam is off.

Focusing system 100 can include one or more fluid knives and one or more nozzles, such as purging nozzles and vacuum nozzles. Fluid knives, purging nozzles, and vacuum nozzles may be configured to operate together to reduce or to eliminate dust and vapor in the path of collimated laser beam. Dust or vapor in the path of laser the laser beam may disrupt, bend, or scatter the laser beam.

A fluid knife is configured to sweep dust or vapor from mono-optic element 105. In some implementations, fluid knife is proximate to mono-optic element 105 and is configured to discharge a fluid or a gas onto, or across, a surface of mono-optic element 105. Examples of gas that may be used include air and nitrogen. In some implementations, the combined operation of fluid knives and purging nozzles can create an unobstructed path for transmission of the laser beam 160 from mono-optic element 105 to a surface of a casing or liner.

In this regard, purging nozzles are configured to clear a path between mono-optic element 105 and a casing or liner by discharging a purging medium on or near laser muzzle 145. In some implementations, the purging media can be, or include, a non-reactive, non-damaging gas such as nitrogen. In some implementations, purging may be cyclical. For example, purging may occur while the laser beam is on.

Dust or vapor may be created by sublimation of the rock, as described. Vacuum nozzles may be configured to aspirate or to vacuum such dust or vapor from an area surrounding laser muzzle 145. The dust or vapor can be sent to the surface and analyzed. The dust or vapor can be analyzed to determine a type of the rock and fluids contained in the rock. The vacuum nozzles can be positioned flush with the laser muzzle. The vacuum nozzles may include one, two, three, four, or more nozzles depending, for example, on the quantity of dust and vapor. The size of vacuum nozzles may depend, for example, on the volume of dust or vapor to be removed and the physical requirements of the system to transport the dust to the surface. Vacuum nozzles can operate cyclically or continuously.

The laser tool may operate downhole to create openings in a casing or liner in the wellbore. In an example, a wellbore includes a casing or liner that is cemented in place to reinforce the wellbore against a rock formation. During a cementing procedure, cement slurry is injected between the casing or liner and the rock formation, thus cementing the casing or liner in place. The laser tool may be used to generate a laser beam that has an energy density that is great enough to create one or more openings in the casing or liner, and to heat the casing/liner material or cement to cause thermal expansion of the material or cement. One or more sections may be cut into the casing or liner. Thermal expansion causes the cut sections to detach and fall into the wellbore. The laser tool is configured to allow sufficient space between tool and casing for cut sections to detach and fall. In some implementations, the laser tool is removed after completion of the cutting procedure. After removal of the laser tool, a mechanical breaking tool is lowered into the well to detach any remaining cut sections that are still attached from the underlying material and cause the cut sections to fall into the well. In some implementations, a breaking tool is or includes a shearing implement, a mill, or a drill.

The laser tool may operate downhole to create openings in a casing or liner in the wellbore to provide access for a wellbore drilling tool. In an example, an existing single wellbore is converted to a multilateral well. A multilateral well is a single well having one or more wellbore branches extending from a main borehole. In order to drill a lateral well into a rock formation from an existing wellbore, an opening is created in the casing of the existing wellbore. The laser tool may be used to create an opening in the casing at a desired location for a wellbore branching point. The opening may provide access for drilling equipment to drill the lateral wellbore.

At least part of the laser tool system and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A system comprising:
   a laser tool configured to operate within a wellbore of a hydrocarbon-bearing rock formation to cut one or more sections in a casing or liner, the laser tool comprising:
   one or more optical transmission media, the one or more optical transmission media being part of an optical path originating at a laser generator configured to generate a laser beam, the one or more optical transmission media for passing the laser beam;
   a mono-optic element that is part of the optical path, the mono-optic element for receiving the laser beam from the one or more optical transmission media and for altering at least one of a geometry or a direction of the laser beam for output to the casing or liner in the hydrocarbon-bearing rock formation;
   one or more sensors to monitor one or more conditions in the wellbore and to output signals based on the one or more conditions; and
   a breaking tool to dislodge one or more cut sections, wherein the breaking tool is a separate tool than the laser tool.

2. The system of claim 1, where the laser tool comprises a focusing system configured to focus or to collimate the laser beam prior to output, and
   where the mono-optic is composed of plastic.

3. The system of claim 2, further comprising an orientation system, the orientation system comprising at least one of an electrical system, a hydraulic system, and a motor-operated system to implant rotational motion of the laser tool,
   where the focusing system comprises the mono-optic element, where the mono-optic element is configured to focus or to collimate the laser beam prior to output.

4. The system of claim 3, where the focusing system comprises a laser muzzle to discharge the laser beam from the focusing system, a fluid knife proximate to a part of the mono-optic element that faces the laser muzzle, a purging nozzle proximate to the laser muzzle, a vacuum nozzle proximate to the laser muzzle, and a temperature sensor adjacent to the laser muzzle,
   where the fluid knife is configured to sweep the mono-optic element, the purging nozzle is configured to remove dust and vapor from a path of the laser beam, and the vacuum nozzle is configured to collect dust and vapor from the path, and
   where the orientation system comprises a set of concentric tubes connected to each other via a threaded configuration, where rotation of at least one tube of the set of concentric tubes about its longitudinal axis causes longitudinal translation of the at least one tube relative to at least one other concentric tube of the set of concentric tubes.

5. The system of claim 1, further comprising:
   a stabilizer attached to the laser tool and configured to hold the laser tool in place relative to a casing in a wellbore, and
   a motion system comprising:
      a cable that is configured to move uphole or downhole to enable the laser tool to reach a target elevation;
      a reel on which the cable is at least partially spooled; and
      a motor connected to the reel and configured to drive the reel to wind the cable therearound.

6. The system of claim 4, further comprising a shock absorber located at an end of the laser tool and configured to absorb impact to a distal end of the laser tool.

7. The system of claim 6, wherein the mono-optic element comprises at least one cylinder, and
   wherein an energy density at a laser beam target on the casing or liner is 70% or more of the energy density of the laser beam output by the laser generator.

8. The system of claim 1, wherein the mono-optic element comprises a structure comprised of two or more of: a crystal, a lens, a mirror, a prism, a cube, a cylinder, or a cone, and
   wherein the laser generator comprises a 5.34 kilowatt (kW) ytterbium-doped, multi-clad fiber laser.

9. The system of claim 1, further comprising an orientation system, the orientation system comprising at least one of a hydraulically actuated arm and an axle on which the laser generator is mounted, the axle being rotationally driven by an electric motor, wherein the breaking tool comprises a drill or a mill.

10. The system of claim 1, further comprising a collection tool downhole or the laser tool to collect the one or more cut sections,
    where the collection tool comprises an inverted umbrella collector suspended from a support structure at or near a surface opening of the wellbore, and
    where the inverted umbrella collector is configured to travel through the wellbore in a folded configuration and be deployed into an unfolded configuration once the collection tool is positioned at a desired location.

11. A method performed within a casing or liner in a wellbore of a hydrocarbon-bearing rock formation, the method comprising:
    passing, through one or more optical transmission media, a laser beam generated by a laser generator at an origin of an optical path comprising the one or more optical transmission media;
    rotating, about an axis, and translating, along the axis, a laser tool comprising a mono-optic element that is part of the optical path, the mono-optic element receiving the laser beam from the one or more optical transmission media, and altering at least one of a geometry or a direction of the laser beam for output to the casing or liner, thereby cutting one or more sections in the casing or liner and causing the one or more cut sections or an underlying cement layer to expand;

removing the laser tool from the wellbore after cutting one or more sections in the casing; and lowering a mechanical breaking tool into the wellbore for detaching any remaining cut sections that are still attached to the casing or liner, after removing the laser tool from the wellbore.

12. The method of claim 11, comprising:

rotating and translating the laser tool to target a different area of the casing or liner.

13. The method of claim 11, comprising operating the laser generator in a continuous mode, wherein cutting one or more sections in the casing or liner comprises cutting steel at a rate of about 22 mm/s to about 25 mm/s.

14. The method of claim 11, further comprising cycling the laser generator between an on period and an off period, wherein the cutting of one or more sections and the expansion of the cement layer causes the cut sections to detach and fall downhole, and wherein the off period comprises a different time duration than the on period.

15. The method of claim 11, comprising monitoring, using one or more sensors, one or more conditions in the wellbore during operation of the laser tool; and outputting signals based on the one or more conditions, wherein, in a fluid environment, cutting one or more sections in the casing or liner comprises cutting steel at a rate of about 10 mm/s to about 20 mm/s.

16. The method of claim 11, comprising the mono-optic element focusing or collimating the laser beam;

sweeping the mono-optic element using a fluid knife; and purging a path of the laser beam using a purging nozzle during the run mode of the laser generator.

17. The method of claim 16, further comprising:

purging a path of the laser beam using the purging nozzle; and vacuuming the dust and vapor using at least one vacuum nozzle.

18. The method of claim 17, comprising dislodging one or more cut section and causing the one or more cut sections to fall downhole.

19. The method of claim 18, wherein the dislodging comprises drilling or milling, and wherein cutting one or more sections in the casing or liner comprises performing a radial cut in approximately 20 seconds.

20. The method of claim 11, comprising collecting the one or more cut sections.

\* \* \* \* \*